United States Patent
Noy et al.

(10) Patent No.: US 7,373,563 B2
(45) Date of Patent: May 13, 2008

(54) ROOT CAUSE CORRELATION IN CONNECTIONLESS NETWORKS

(75) Inventors: Ariel Noy, Herzliya (IL); Danny Kibel, Givatayim (IL)

(73) Assignee: Sheer Networks Inc., San Jose, CA (US)

( * ) Notice: Subject to any disclaimer, the term of this patent is extended or adjusted under 35 U.S.C. 154(b) by 220 days.

(21) Appl. No.: 10/527,239

(22) PCT Filed: Sep. 8, 2003

(86) PCT No.: PCT/IL03/00741

§ 371 (c)(1),
(2), (4) Date: Sep. 14, 2005

(87) PCT Pub. No.: WO2004/023719

PCT Pub. Date: Mar. 18, 2004

(65) Prior Publication Data

US 2006/0095815 A1    May 4, 2006

Related U.S. Application Data

(60) Provisional application No. 60/408,906, filed on Sep. 9, 2002.

(51) Int. Cl.
*G01R 31/28* (2006.01)
*H03M 13/00* (2006.01)
*G06F 11/00* (2006.01)

(52) U.S. Cl. .......................... 714/712; 714/776; 714/43

(58) Field of Classification Search ..................... None
See application file for complete search history.

(56) References Cited

U.S. PATENT DOCUMENTS

| 6,353,902 | B1 * | 3/2002 | Kulatunge et al. ........... 714/712 |
| 6,377,677 | B1 * | 4/2002 | Ackerley et al. ........... 379/279 |
| 6,683,865 | B1 * | 1/2004 | Garcia-Luna-Aceves et al. 370/349 |
| 6,813,241 | B1 * | 11/2004 | Wang et al. ................. 370/228 |
| 2002/0103631 | A1 | 8/2002 | Feldman et al. |

FOREIGN PATENT DOCUMENTS

WO    WO 01/19038    3/2001

* cited by examiner

*Primary Examiner*—Phung M. Chung
(74) *Attorney, Agent, or Firm*—AlphaPatent Associates Ltd.; Daniel J. Swirsky

(57) ABSTRACT

A method for correlating routing errors to link failures in a network, the method including detecting a link failure between a first and a second router NODES in a network, associating a first node address indicated in a first routing table of the first router with a first partition of network, where a next hop of a packet destined for the first node address is the second router, associating a second node address indicated in a second routing table of the second router with a second partition of the network, where a next hop of a packet destined for the second node address is the first router, and correlating an error notification resulting from the failed delivery of a packet with the link failure where a source address of the packet corresponds to the first node address and a destination address of the packet corresponds to the second node address.

26 Claims, 5 Drawing Sheets

ROOT CAUSE CORRELATION IN CONNECTIONLESS NETWORKS

CROSS-REFERENCE TO RELATED APPLICATIONS

This application is a U.S. National Phase Application under 35 U.S.C. 371 of PCT International Application No. PCT/IL2003/000741, which has an international filing date of Sep. 8, 2003, and which claims priority from U.S. Provisional Patent Application No. 60/408,906, filed Sep. 9, 2002.

FIELD OF THE INVENTION

The present invention relates to computer network technology in general, and in particular to correlation of network errors to root causes in connectionless networks.

BACKGROUND OF THE INVENTION

Connectionless computer networks, such as Internet Protocol (IP) networks, are typically formed by connecting multiple routers to each other using either point-to-point connections or the Data Link Layer of the International Standard Organization's Open System Interconnect (ISO/OSI) network model, commonly referred to as "layer 2." One of the main features of a connectionless network is the ability of a network node, such as a PC, to connect directly to any of the routers and send/receive packetized data to/from any other network node connected to any other router. To accomplish this each node is typically uniquely identified by a unique network address, known in IP networks as an IP address.

Routing of packets in a connectionless computer network is now described by way of example with reference to FIG. 1. When a node A (100) sends a packet to a node B (102), A (100) must specify the address of B (102) as the destination address of the packet. The first router R1 (108) that accepts the packet forwards the packet to the next router R2 (110) on the path to B (102), whereupon R2 (110) forwards the packet to the next router R3 (112) on the path to B (102), and so on. When the packet reaches the router to which B (102) is directly connected, it is forwarded to B (102). It may thus be seen that, for any given destination address to which a packet is addressed, every router in the network should know the packet's next "hop," i.e., to which next router the packet is to be forwarded. Each router typically maintains this information in a routing table, shown as routing tables 116 and 118, which contains a mapping between addresses or address groups, such as IP subnets, and the next hop for packets destined for these addresses.

When a link connecting two routers in a network fails, a partitioning of the network may occur. Thus in FIG. 1, if the link between R1 (108) and R2 (110) fails, nodes A (100) and C (104) can still communicate with each other but not with nodes B (102) and D (106), and vice versa. Each router will typically automatically detect this situation and update its routing table accordingly, such as by eliminating entries whose next hop is unreachable. However, nodes in one partition may still try to send packets to nodes in the other partition. When this occurs, a "no route to destination" error is typically generated and logged by the first router to detect the problem, which then reports the problem to the network management system (NMS). The NMS must then decide what action to take, such as tracing the error to its root cause. In large networks where there may be many active communication sessions between nodes at one time, a single link failure event might cause numerous "no route to destination" notifications to be generated in every router in one partition which receives packets that are destined for the other partition and reported to the NMS. Thus, where the existence of a link failure is already known to the NMS, it would be advantageous to know whether or not a routing error is caused by the link failure, as well as which nodes might be affected by the link failure, obviating the need for the NMS to take action that it would normally take.

SUMMARY OF TIE INVENTION

The present invention provides for the correlation of routing errors to link failures in a connectionless network.

In one aspect of the present invention a method is provided for correlating routing errors to link failures in a network, the method including detecting a link failure between a first and a second router in a network, associating a first node address indicated in a first routing table of the first router with a first partition of the network, where a next hop of a packet destined for the first node address is the second router, associating a second node address indicated in a second routing table of the second router with a second partition of the network, where a next hop of a packet destined for the second node address is the first router, and correlating an error notification resulting from the failed delivery of a packet with the link failure where a source address of the packet corresponds to the first node address and a destination address of the packet corresponds to the second node address.

In another aspect of the present invention any of the steps are performed with respect to a connectionless network.

In another aspect of the present invention a method the correlating step includes correlating a "no route to destination" error.

In another aspect of the present invention the associating steps comprise constructing a connectivity table.

In another aspect of the present invention the method further includes suppressing the error.

In another aspect of the present invention any of the steps are performed in a distributed network management system by at least one software agent associated with either of the routers.

In another aspect of the present invention the method further includes notifying at least one other agent in the network of the associations of the nodes to the partitions, where the other agent is not associated with either of the routers.

In another aspect of the present invention a method is provided for correlating routing errors to link failures in a network, the method including identifying a path between a first node and a second node in a network, detecting a link failure in the network determining if the link failure lay along the path, and correlating an error notification resulting from the failed delivery of a packet with the link failure where a source address of the packet corresponds to an address of the first node, where a destination address of the packet corresponds to an address of the second node, and where the link failure lay along the path.

In another aspect of the present invention the identifying step includes identifying either of a most commonly used route and a most heavily used route between the nodes in accordance with a predefined measure of use.

In another aspect of the present invention any of the steps are performed with respect to a connectionless network.

In another aspect of the present invention the correlating step includes correlating a "no route to destination" error.

In another aspect of the present invention the method further includes suppressing the error.

In another aspect of the present invention any of the steps are performed in a distributed network management system by a software agent associated with either of the routers.

In another aspect of the present invention a system is provided for correlating routing errors to link failures in a network, the system including means for detecting a link failure between a first and a second router in a network, means for associating a first node address indicated in a first routing table of the first router with a first partition of the network, where a next hop of a packet destined for the first node address is the second router, means for associating a second node address indicated in a second routing table of the second router with a second partition of the network, where a next hop of a packet destined for the second node address is the first router, and means for correlating an error notification resulting from the failed delivery of a packet with the link failure where a source address of the packet corresponds to the first node address and a destination address of the packet corresponds to the second node address.

In another aspect of the present invention any of the means are operative with respect to a connectionless network.

In another aspect of the present invention the means for correlating is operative to correlate a "no route to destination" error.

In another aspect of the present invention the means for associating are operative to construct a connectivity table.

In another aspect of the present invention the system further includes means for suppressing the error.

In another aspect of the present invention a system any of the means are operative in a distributed network management system including at least one software agent associated with either of the routers.

In another aspect of the present invention the system further includes means for notifying at least one other agent in the network of the associations of the nodes to the partitions, where the other agent is not associated with either of the routers.

In another aspect of the present invention a system is provided for correlating routing errors to link failures in a network, the system including means for identifying a path between a first node and a second node in a network, means for detecting a link failure in the network, means for determining if the link failure lay along the path, and means for correlating an error notification resulting from the failed delivery of a packet with the link failure where a source address of the packet corresponds to an address of the first node, where a destination address of the packet corresponds to an address of the second node, and where the link failure lay along the path.

In another aspect of the present invention the means for identifying is operative to identify either of a most commonly used route and a most heavily used route between the nodes in accordance with a predefined measure of use.

In another aspect of the present invention any of the means are operative with respect to a connectionless network.

In another aspect of the present invention the means for correlating step is operative to correlate a "no route to destination" error.

In another aspect of the present invention the system further includes means for suppressing the error.

In another aspect of the present invention any of the means are operative in a distributed network management system including a software agent associated with either of the routers.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
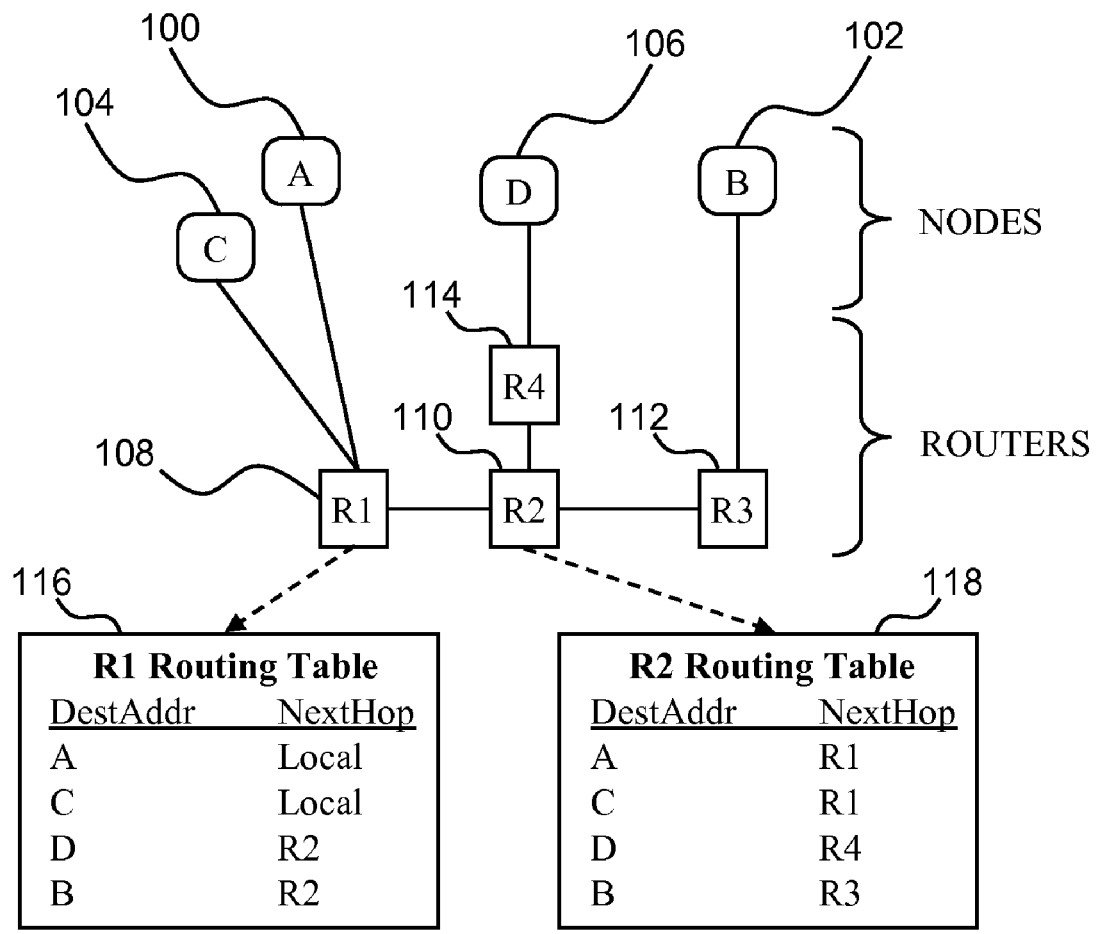
FIG. 1 is a simplified pictorial illustration of a network framework, usefull in understanding present invention.
Figure 2:
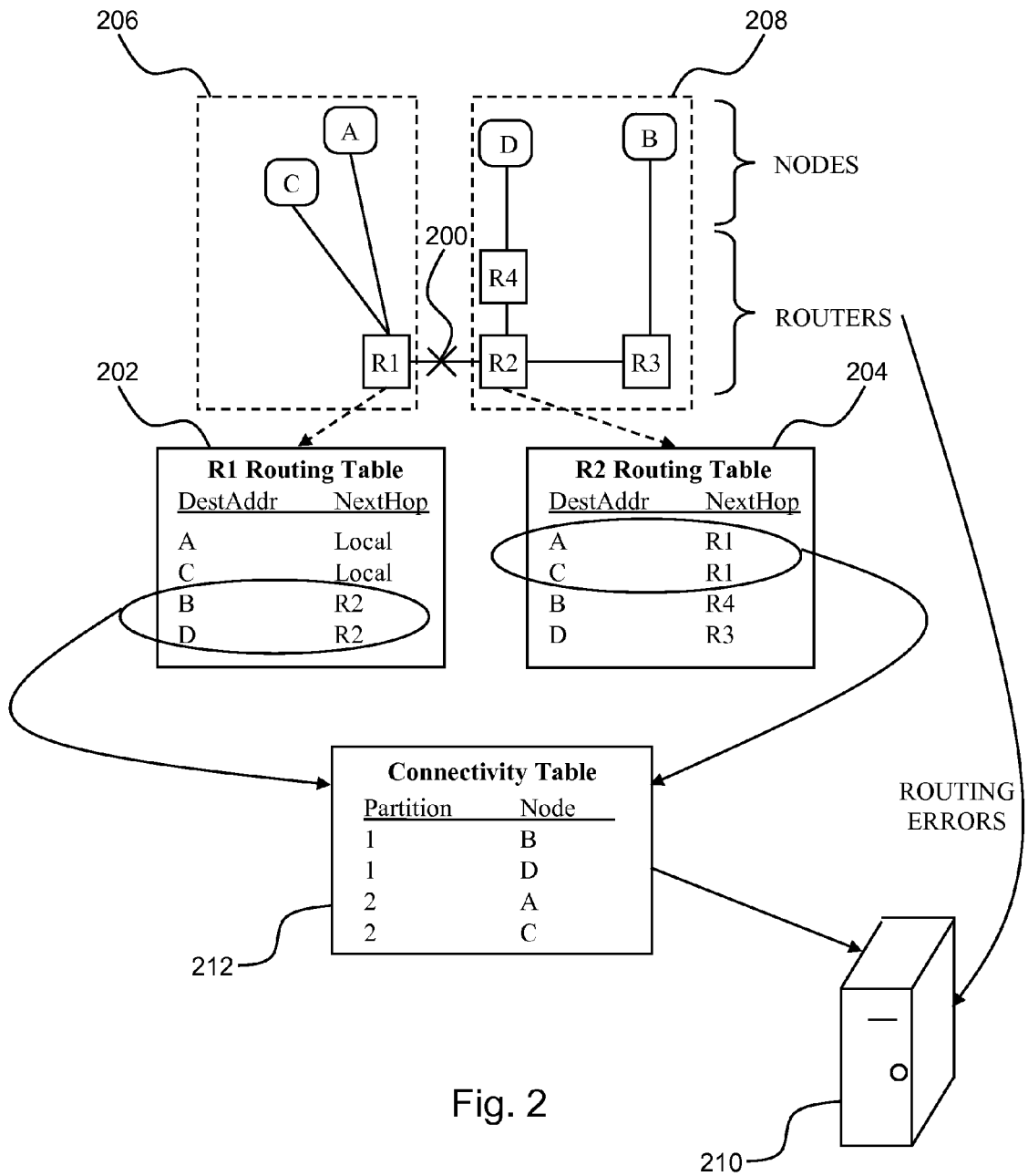
FIG. 2 is a simplified pictorial illustration of a network framework supporting error correlation, constructed and operative in accordance with a preferred embodiment of the present invention.
Figure 3:
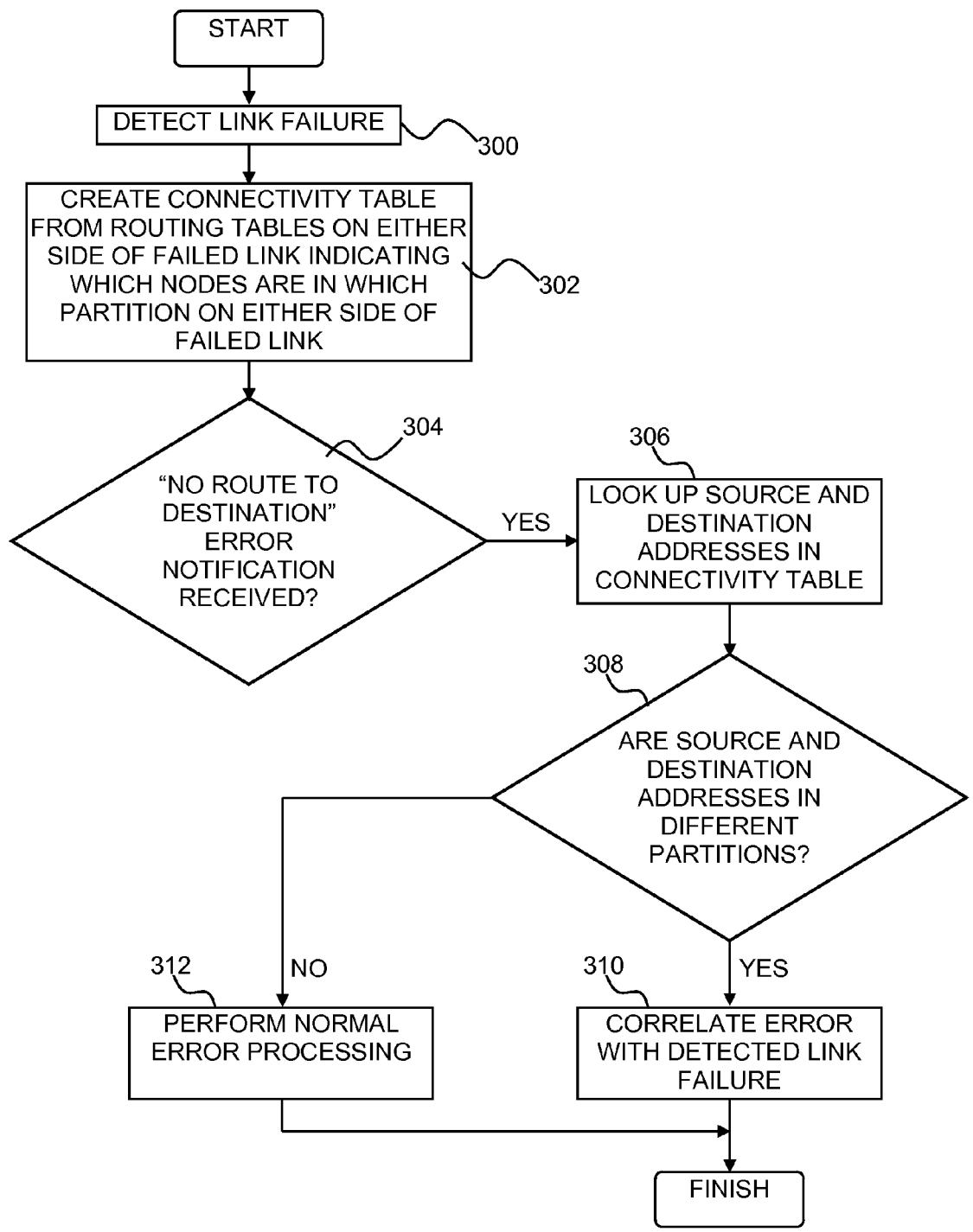
FIG. 3 is a simplified flowchart illustration of a method of correlation of routing errors to link failures in a connectionless network, operative in accordance with a preferred embodiment of the present invention.

Reference is now made to FIG. 2, which is a simplified pictorial illustration of a network framework supporting error correlation, constructed and operative in accordance with a preferred embodiment of the present invention, and additionally to FIG. 3, which is a simplified flowchart illustration of a method of correlation of routing errors to link failures in a connectionless network, operative in accordance with a preferred embodiment of the present invention. In FIG. 2 a link 200 between two routers R1 and R2 is shown as having failed, as designated by an 'x' through link 200. Prior to the failure of link 200, a routing table 202 of router R1 shows that the next hop for packets destined for B and D is R2, while a routing table 204 of router R2 shows that the next hop for packets destined for A and C is R1. It may be seen that two partitions 206 and 208 (shown in dashed lines) are thus created in that nodes A and C cannot communicate with nodes B and D via link 200, and vice versa.

A network management system (NMS) 210 preferably maintains copies of routing tables 202 and 204. Having detected a link failure between R1 and R2 (FIG. 3, step 300), NMS 210 may create a connectivity table 212 indicating which nodes are in each of partitions 206 and 208 (FIG. 3, step 302). Since NMS 210 knows that R2 is inaccessible to R1 via link 200, NMS 210 may associate with partition 206 those node addresses in its copy of routing table 202 whose next hop is R2. Likewise, NMS 210 may associate with partition 208 those node addresses in routing table 204 whose next hop is R1. Should NMS 210 receive a "no route to destination" error notification (FIG. 3, step 304) from a network router together with the source and destination addresses of the packet that could not be delivered, NMS 210 may look up the source and destination addresses in connectivity table 212 (FIG. 3, step 306) to determine whether they are from different partitions. If both the source and destination addresses are from different partitions (FIG. 3, step 308), then the "no route to destination" error notification may be an attempt to send the packet across failed link 200. Thus, the error notification may be correlated with the link failure (FIG. 3, step 310) that is already known to NMS 210, and the error may be suppressed and need not be investigated further. Alternatively (FIG. 3, step 312), the error notification should not be correlated with the link failure and may be investigated or otherwise acted upon by NMS 210.

Figure 4:
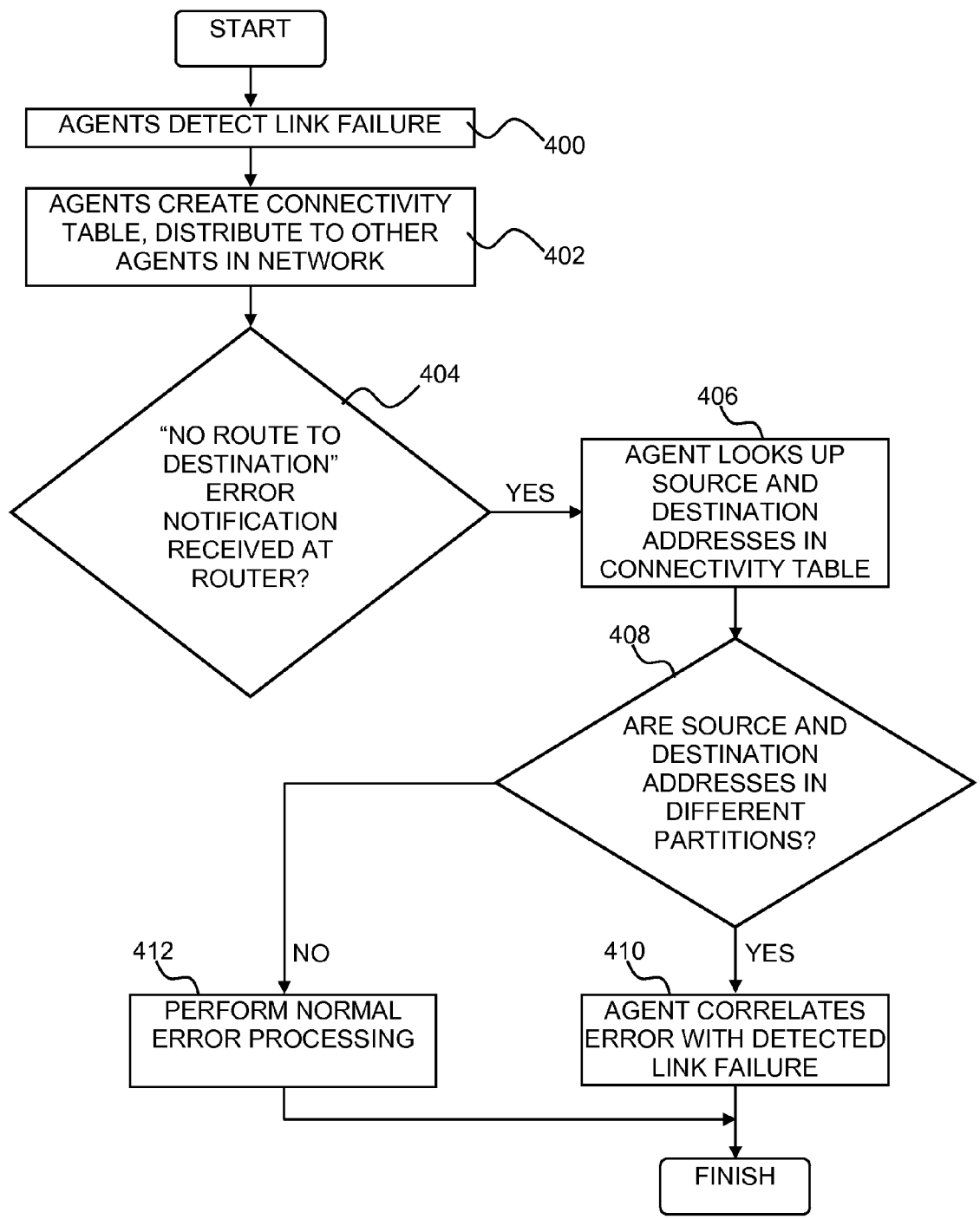
FIG. 4 is a simplified flowchart illustration of a method of correlation of routing errors to link failures in a connectionless network supported by a distributed network management system, operative in accordance with a preferred embodiment of the present invention.

Reference is now made to FIG. 4, which is a simplified flowchart illustration of a method of correlation of routing errors to link failures in a connectionless network supported by a distributed network management system, operative in accordance with a preferred embodiment of the present invention. In FIG. 4 the present invention is implemented in a distributed network management system, such as is described in U.S. patent application Ser. No. 09/799,637 and published as Published Application No. 20010039577, where every router has an associated software agent which continuously monitors the state of the router and its links. The agents monitoring R1 and R2 would thus detect the failure of link 200 (step 400) and then communicate with each other to create connectivity table 212 (step 402) which may then be provided to the agents of all other routers in the network. Thus, when any router Rx encounters a "no route to destination" error (step 404), its associated agent looks up the source and destination addresses in connectivity table 212 (step 406) to determine whether they are from different partitions (step 408), and action may be taken (step 410) or the error notification ignored (step 412) as described above.

Figure 5:
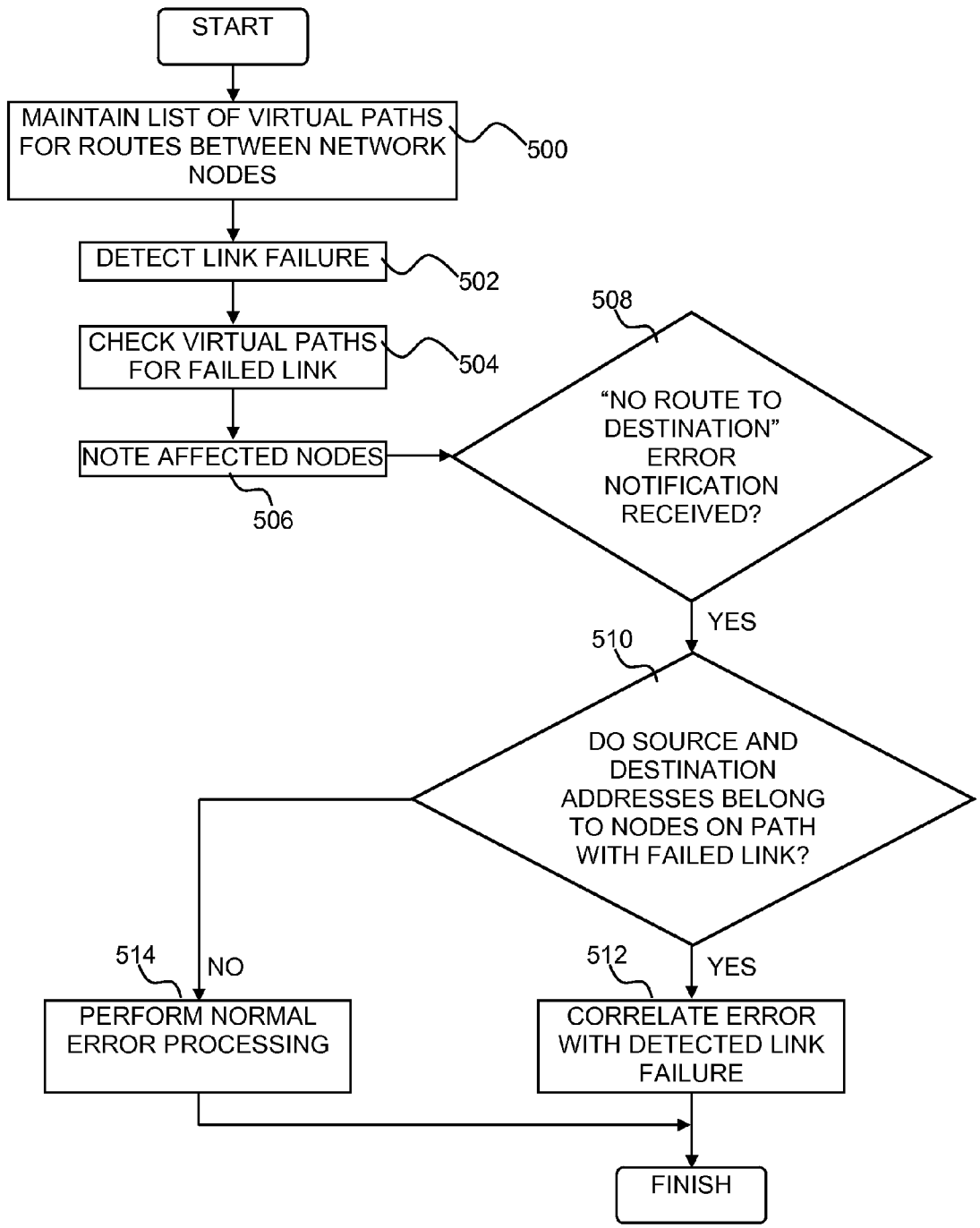
FIG. 5 is a simplified flowchart illustration of a method of identifying nodes that may be affected by link failures in a connectionless network, operative in accordance with a preferred embodiment of the present invention.

Reference is now made to FIG. 5, which is a simplified flowchart illustration of a method of identifying nodes that may be affected by link failures in a connectionless network, operative in accordance with a preferred embodiment of the present invention. In FIG. 5 a list of virtual paths in a network is maintained (step 500), where each virtual path represents the traversal of the links, routers, and other network elements comprising the most commonly used and/or most heavily used routes between network nodes, as determined using any predefined measure of use. The virtual path list may be maintained centrally, such as by NMS 210, or in a distributed manner, such as by one or more agents in a distributed network management system. The virtual path list may be created using any conventional technique, such as by identifying common access patterns in router access lists, analyzing network failure alarms (e.g., packet lost, no route, etc.) to determine traffic flow, and determining network tomography from traffic counter patterns. When a failed link is detected (step 502), each virtual path may be checked using any known technique to determine if it is broken (step 504) and, if so, which nodes and other network elements along the path are affected (step 506). Thereafter, should a "no route to destination" error be encountered (step 508) where the source address of the packet being sent belongs to the node at one end of a virtual path known to have a failed link (step 510), and the packet's destination address belongs to the node at the other end of the virtual path, the error may be correlated to the failed link and action may be taken (step 512) or suppressed (step 514) as described hereinabove.

It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, it is appreciated that the methods and apparatus described herein may be readily implemented in hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for correlating routing errors to link failures in a network, the method comprising:
    detecting a link failure between a first and a second router in a network;
    associating a first node address indicated in a first routing table of said first router with a first partition of said network wherein a next hop of a packet destined for said first node address is said second router;
    associating a second node address indicated in a second routing table of said second router with a second partition of said network, wherein a next hop of a packet destined for said second node address is said first router; and
    correlating an error notification resulting from the failed delivery of a packet with said link failure where a source address of said packet corresponds to said first node address and a destination address of said packet corresponds to said second node address.

2. A method according to claim 1 wherein any of said steps are performed with respect to a connectionless network.

3. A method according to claim 1 wherein said correlating step comprises correlating a "no route to destination" error.

4. A method according to claim 1 wherein said associating steps comprise constructing a connectivity table.

5. A method according to claim 1 and further comprising suppressing said error.

6. A method according to claim 1 wherein any of said steps are performed in a distributed network management system by at least one software agent associated with either of said routers.

7. A method according to claim 6 and further comprising notifying at least one other agent in said network of said associations of said nodes to said partitions, wherein said other agent is not associated with either of said routers.

8. A method for correlating routing errors to link failures in a network, the method comprising:
    identifying a path between a first node and a second node in a network;
    detecting a link failure in said network;
    determining if said link failure lay along said path; and
    correlating an error notification resulting from the failed delivery of a packet with said link failure where a source address of said packet corresponds to an address of said first node, where a destination address of said packet corresponds to an address of said second node, and where said link failure lay along said path.

9. A method according to claim 8 wherein said identifying step comprises identifying either of a most commonly used route and a most heavily used route between said nodes in accordance with a predefined measure of use.

10. A method according to claim 8 wherein any of said steps are performed with respect to a connectionless network.

11. A method according to claim 8 wherein said correlating step comprises correlating a "no route to destinations" error.

12. A method according to claim 8 and further comprising suppressing said error.

13. A method according to claim 8 wherein any of said steps are performed in a distributed network management system by a software agent associated with either of said routers.

14. A system for correlating routing errors to link failures in a network, the system comprising:
   means for detecting a link failure between a first and a second router in a network;
   means for associating a first node address indicated in a first routing table of said first router with a first partition of said network, wherein a next hop of a packet destined for said first node address is said second router;
   means for associating a second node address indicated in a second routing table of said second router with a second partition of said network, wherein a next hop of a packet destined for said second node address is said first router; and
   means for correlating an error notification resulting from the failed delivery of a packet with said link failure where a source address of said packet corresponds to said first node address and a destination address of said packet corresponds to said second node address.

15. A system according to claim 14 wherein any of said means are operative with respect to a connectionless network.

16. A system according to claim 14 wherein said means for correlating is operative to correlate a "no route to destination" error.

17. A system according to claim 14 wherein said means for associating are operative to construct a connectivity table.

18. A system according to claim 14 and further comprising means for suppressing said error.

19. A system according to claim 14 wherein any of said means are operative in a distributed network management system comprising at least one software agent associated with either of said routers.

20. A system according to claim 19 and further comprising means for notifying at least one other agent in said network of said associations of said nodes to said partitions, wherein said other agent is not associated with either of said routers.

21. A system for correlating routing errors to link failures in a network, the system comprising:
   means for identifying a path between a first node and a second node in a network;
   means for detecting a link failure in said network;
   means for determining if said link failure lay along said path; and
   means for correlating an error notification resulting from the failed delivery of a packet with said link failure where a source address of said packet corresponds to an address of said first node, where a destination address of said packet corresponds to an address of said second node, and where said link failure lay along said path.

22. A system according to claim 21 wherein said means for identifying is operative to identify either of a most commonly used route and a most heavily used route between said nodes in accordance with a predefined measure of use.

23. A system according to claim 21 wherein any of said means are operative with respect to a connectionless network.

24. A system according to claim 21 wherein said means for correlating step is operative to correlate a "no route to destination" error.

25. A system according to claim 21 and further comprising means for suppressing said error.

26. A system according to claim 21 wherein any of said means are operative in a distributed network management system comprising a software agent associated with either of said routers.

* * * * *